United States Patent
Ogata

(10) Patent No.: US 12,449,262 B2
(45) Date of Patent: Oct. 21, 2025

(54) VEHICLE POSITION ESTIMATION DEVICE AND VEHICLE POSITION ESTIMATION METHOD

(71) Applicant: Hitachi Astemo, Ltd., Hitachinaka (JP)

(72) Inventor: Takeshi Ogata, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 197 days.

(21) Appl. No.: 18/008,857

(22) PCT Filed: Feb. 24, 2021

(86) PCT No.: PCT/JP2021/006915
§ 371 (c)(1),
(2) Date: Dec. 7, 2022

(87) PCT Pub. No.: WO2022/070458
PCT Pub. Date: Apr. 7, 2022

(65) Prior Publication Data
US 2023/0221126 A1    Jul. 13, 2023

(30) Foreign Application Priority Data

Sep. 29, 2020    (JP) .................................. 2020-163726

(51) Int. Cl.
*G01C 21/30* (2006.01)
*G09B 29/10* (2006.01)

(52) U.S. Cl.
CPC .................................... *G01C 21/30* (2013.01)

(58) Field of Classification Search
CPC ................................ G01C 21/30; G09B 29/10
See application file for complete search history.

(56) References Cited

U.S. PATENT DOCUMENTS

2003/0204299 A1 *  10/2003  Waldis ............... B60K 31/0058
                                                     123/352
2007/0021912 A1 *   1/2007  Morita ............... G01C 21/3602
                                                     701/431
(Continued)

FOREIGN PATENT DOCUMENTS

| JP | 2006-189325 A | 7/2006 |
| JP | 2008-145142 A2 | 6/2008 |
| JP | 2019-002764 A | 1/2019 |

OTHER PUBLICATIONS

International Search Report with English Translation and Written Opinion in International Application No. PCT/JP2021/006915 dated Apr. 13, 2021.

*Primary Examiner* — Tyler D Paige
(74) *Attorney, Agent, or Firm* — Foley & Lardner LLP

(57) ABSTRACT

An object of the present invention is to obtain a host vehicle position estimation device capable of estimating a highly reliable traveling road. The present invention relates to a host vehicle position estimation device (100) that estimates a position on a map of a host vehicle using information of an autonomous navigation position calculated based on vehicle information (102) and output of an inertial sensor (101), and information of a positioning position acquired from a positioning satellite, and corrects the autonomous navigation position to a position of a road on the map at predetermined travel distance intervals when the information of the positioning position is unavailable. The host vehicle position estimation device (100) includes a correction determination unit (12) that determines whether or not to perform the correction based on a position and an orientation of the host vehicle traveling on the road.

2 Claims, 8 Drawing Sheets

(56) References Cited

U.S. PATENT DOCUMENTS

| | | | |
|---|---|---|---|
| 2009/0276153 A1* | 11/2009 | Lee | G01C 21/28 |
| | | | 701/414 |
| 2016/0257307 A1* | 9/2016 | Delp | G01C 21/34 |
| 2017/0219359 A1* | 8/2017 | Elhoushi | G01S 19/01 |
| 2019/0301872 A1* | 10/2019 | Jin | G06V 20/584 |
| 2021/0003396 A1* | 1/2021 | Destelle | G06F 17/12 |
| 2021/0010815 A1* | 1/2021 | Kawabata | G01C 21/3691 |
| 2021/0055115 A1* | 2/2021 | Kawabata | G01S 19/485 |
| 2021/0063162 A1* | 3/2021 | Moskowitz | G01C 21/28 |
| 2021/0080265 A1* | 3/2021 | Zhang | G01C 21/3837 |
| 2021/0095971 A1* | 4/2021 | Mao | G06F 16/29 |

\* cited by examiner

VEHICLE POSITION ESTIMATION DEVICE AND VEHICLE POSITION ESTIMATION METHOD

TECHNICAL FIELD

The present invention relates to a host vehicle position estimation device and a host vehicle position estimation method.

BACKGROUND ART

PTL 1 describes that "conventionally, in a vehicle navigation device, for example, radio wave navigation positioning information by a GPS receiver or the like and autonomous navigation positioning information calculated from detection results of a direction sensor such as a gyro sensor and a vehicle speed sensor are combined to estimate coordinates of a host vehicle position, so that estimation accuracy of the host vehicle position is improved. However, the GPS receiver cannot always output positioning information, and a host vehicle position obtained from positioning information by autonomous navigation includes a considerable error. Therefore, in order to further improve accuracy of a host vehicle position, map matching processing is generally employed in a vehicle navigation device. In the map matching processing, on the premise that a vehicle always travels on a road, an obtained host vehicle position and a traveling track of the vehicle are fitted to a road near the vehicle, and the host vehicle position is corrected so as to be matched with a road having a highest correlation. Even if such map matching processing is employed there is a high possibility that a current position of the vehicle is erroneously identified in a case where detection errors of various sensors are large."

CITATION LIST

Patent Literature

PTL 1: JP 2008-145142 A

SUMMARY OF INVENTION

Technical Problem

However, even in a case where these calibrations are performed, errors in detection results of various sensors cannot be completely removed, and as a result, there has been a problem that a wrong road is determined as a road on which a vehicle is traveling.

The present invention has been made in view of the above point, and an object of the present invention is to provide a host vehicle position estimation device and a host vehicle position estimation method capable of estimating a highly reliable traveling road.

Solution to Problem

A host vehicle position estimation device of the present invention that solves the above problem is a host vehicle position estimation device that estimates a position on a map of a host vehicle using information of an autonomous navigation position calculated based on vehicle information and output of an inertial sensor, and information of a positioning position acquired from a positioning satellite, and corrects the autonomous navigation position to a position of a road on the map at predetermined travel distance intervals when the information of the positioning position is unavailable. The host vehicle position estimation device includes a correction determination unit that determines whether or not to perform the correction based on a position and an orientation of the host vehicle traveling on the road.

Advantageous Effects of Invention

According to the present invention, it is possible to estimate a highly reliable traveling road. Further features related to the present invention will become clear from description of the present description and the accompanying drawings. Further, an object, a configuration, and an advantageous effect other than those described above will be clarified in description of an embodiment described below.

DESCRIPTION OF EMBODIMENTS

First Embodiment

In the present embodiment, a configuration in a case where a host vehicle position estimation device according to the present invention is incorporated in an automatic driving vehicle will be described.

Figure 2:
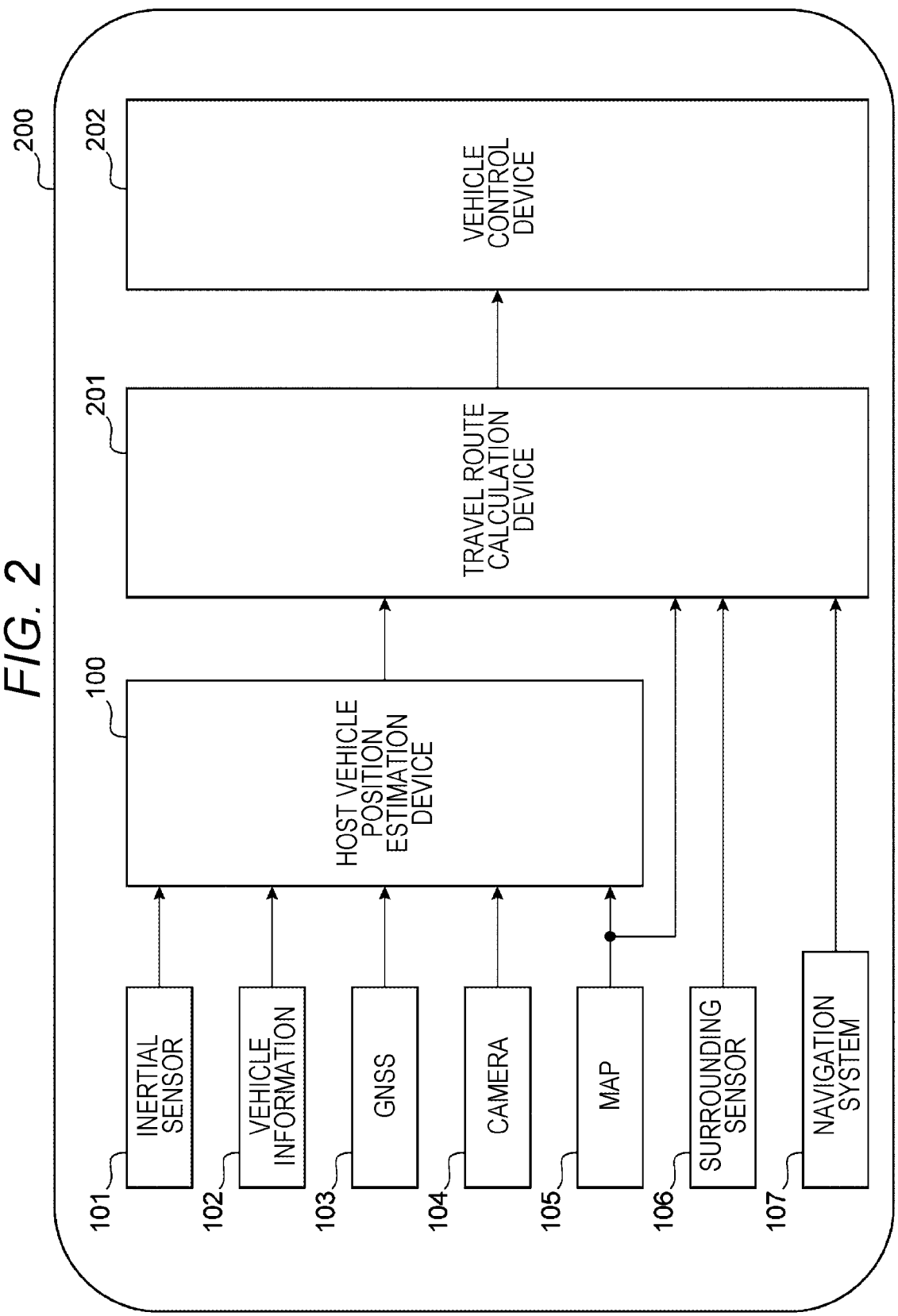
FIG. 2 is a configuration diagram of an automatic driving vehicle.

FIG. 2 illustrates a configuration of an automatic driving vehicle 200.

The automatic driving vehicle 200 includes an inertial sensor 101, vehicle information 102, a GNSS 103, a camera 104, a map 105, a surrounding sensor 106, a navigation system 107, a host vehicle position estimation device 100, a travel route calculation device 201, and a vehicle control device 202. The inertial sensor 101 includes an acceleration sensor and a gyro sensor that detect acceleration, angular velocity, and the like acting on a vehicle, and measures a change in behavior of a host vehicle. The vehicle information 102 includes information such as a wheel rotation speed and a steering angle of a vehicle, and allows calculation of an autonomous navigation position together with output of the inertial sensor 101. The GNSS 103 measures, for example, an absolute position on earth coordinates based on a radio wave from a positioning satellite such as a GPS, and acquires the position as a positioning position. The camera 104 can capture an image of the surroundings of a vehicle and measure a traveling state of a host vehicle with respect to a traveling lane by image processing. The map 105 stores map information including information on a road through which a host vehicle can pass. The surrounding sensor 106 includes, for example, a laser, a lidar, a millimeter wave radar, and the like, and detects surrounding information such as an obstacle around a host vehicle and a situation of a road. The navigation system 107 creates route information for guiding to a target position. Output of the inertial sensor 101 and the vehicle information 102 correspond to the first sensor information in the claims. Information of an absolute position measured by the GNSS 103 corresponds to the second sensor information in the claims. Then, information on an image captured by the camera 104 corresponds to the third sensor information in the claims.

The host vehicle position estimation device 100 estimates a road on which a host vehicle is traveling and a host vehicle position on the basis of the inertial sensor 101, the vehicle information 102, the GNSS 103, the camera 104, and information of the map 105, and sends information of an estimation result to the travel route calculation device 201. The travel route calculation device 201 generates a travel route of a vehicle for a host vehicle to safely arrive at a destination from information of a host vehicle position estimated by the host vehicle position estimation device 100, the map 105, information from the surrounding sensor 106, and route information to the destination from the navigation system 107, and sends the travel route to the vehicle control device 202. The vehicle control device 202 controls a host vehicle to travel along a travel route sent from the travel route calculation device 201. By controlling the vehicle as described above, the automatic driving vehicle 200 can automatically move the host vehicle so as to reach the destination.

Here, operation of the host vehicle position estimation device 100 will be described in detail with reference to FIG. 1.

Figure 1:
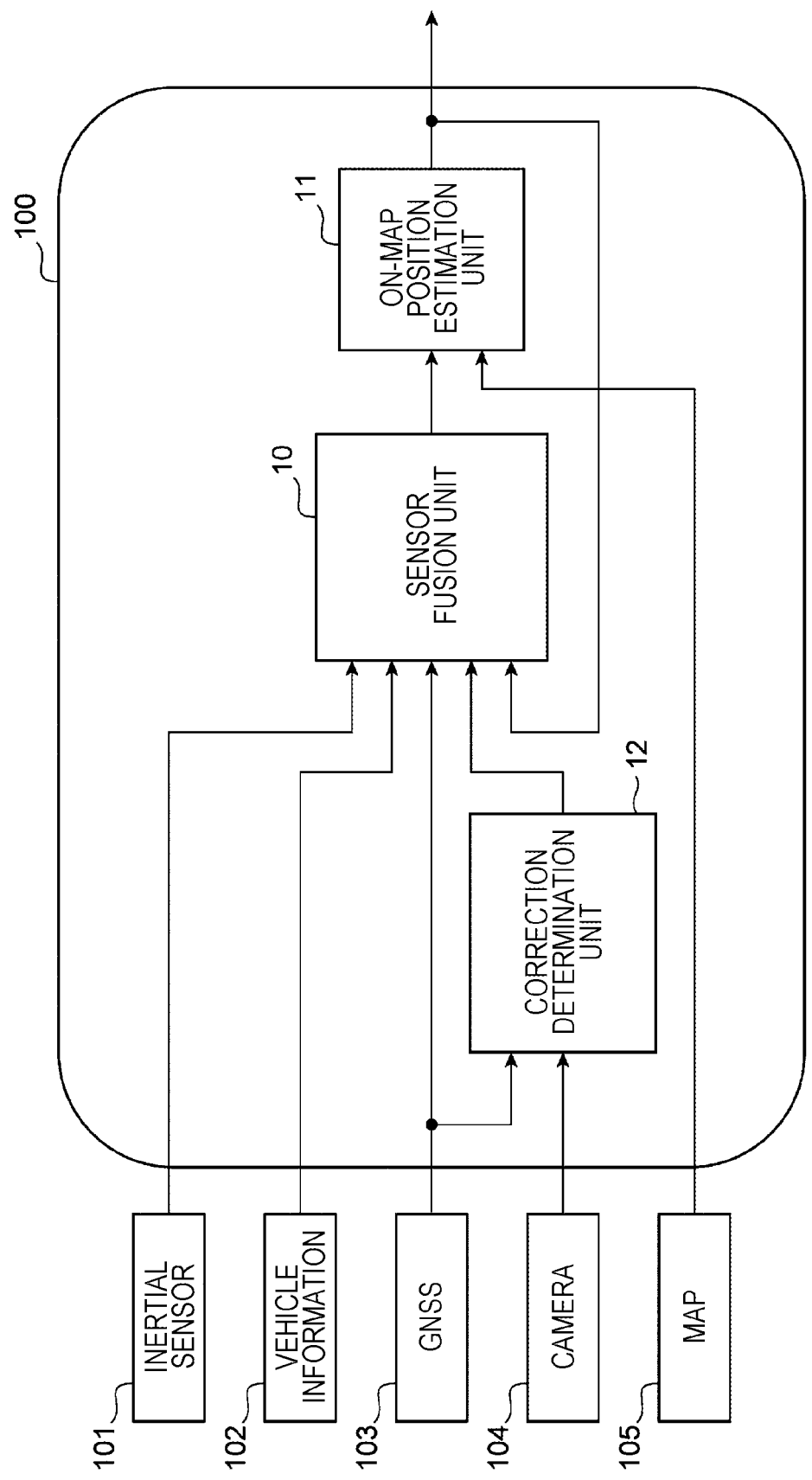
FIG. 1 is a configuration diagram of a host vehicle position estimation device.

FIG. 1 is a configuration diagram of the host vehicle position estimation device 100.

The host vehicle position estimation device 100 includes a sensor fusion unit 10, an on-map position estimation unit 11, and a correction determination unit 12. The sensor fusion unit 10 estimates a current host vehicle position on the basis of output of the inertial sensor 101, information of an autonomous navigation position calculated from the vehicle information 102, and information of a positioning position acquired from the GNSS 103. The on-map position estimation unit 11 estimates a road which is a position of a host vehicle on a map and on which the host vehicle is traveling on the basis of a host vehicle position estimated by the sensor fusion unit 10 and information of the map 105. When information of positioning position is unavailable, the sensor fusion unit 10 corrects an autonomous navigation position to a position of a road on a map at predetermined travel distance intervals. In a case where positioning information of the GNSS 103 is unavailable in a tunnel or the like, the correction determination unit 12 determines whether or not to correct position information output from the sensor fusion unit 10.

Next, detailed operation of the sensor fusion unit 10, the on-map position estimation unit 11, and the correction determination unit 12 will be described.

The sensor fusion unit 10 periodically estimates an absolute position of a host vehicle on the basis of input information input from the inertial sensor 101, the vehicle information 102, and the GNSS 103 and a past result of the sensor fusion unit 10. In a case of not receiving information indicating a determination result that correction is to be performed from the correction determination unit 12, the sensor fusion unit 10 estimates a host vehicle position on the basis of information of acceleration and angular velocity output from the inertial sensor 101, rotational speed information of a wheel included in the vehicle information 102, information from sensors of parts of a vehicle such as a shift position and a steering angle, and information of an absolute position from the GNSS 103.

On the other hand, in a case of receiving the information indicating a determination result that the correction is to be performed from the correction determination unit 12, since positioning information of the GNSS 103 is unavailable, the sensor fusion unit 10 estimates a host vehicle position on the basis of information of a position and a road direction output from the on-map position estimation unit 11, information of acceleration and angular velocity output from the inertial sensor 101, and information included in the vehicle information 102.

The on-map position estimation unit 11 performs map matching processing from a change in host vehicle position information output from the sensor fusion unit 10 and information of the map 105, estimates a road on which a host vehicle is currently traveling and estimates a position on the road, and outputs an estimation result.

The correction determination unit 12 determines whether or not to perform correction by the sensor fusion unit 10, that is, processing of correcting an autonomous navigation position to a position of a road on a map at predetermined travel distance intervals on the basis of a position and an orientation of a host vehicle traveling on the road. The correction determination unit 12 determines to perform correction in a case where the GNSS 103 is not able to continuously perform positioning based on positioning information of the GNSS 103, or positioning accuracy is low and unreliable, and a host vehicle is traveling on a road in a manner parallel to the road on the basis of shape information of a lane marking or a road edge captured in a captured image by the camera 104. That is, in a case where positioning information of the GNSS 103 is unavailable, the correction determination unit 12 determines whether or not a host vehicle is traveling in parallel with a road, determines to perform correction when the host vehicle is traveling in parallel, and determines not to perform correction when the host vehicle is not traveling in parallel.

An effect of the present embodiment will be described with reference to the schematic diagrams of FIGS. 5 and 6.

Figure 5:
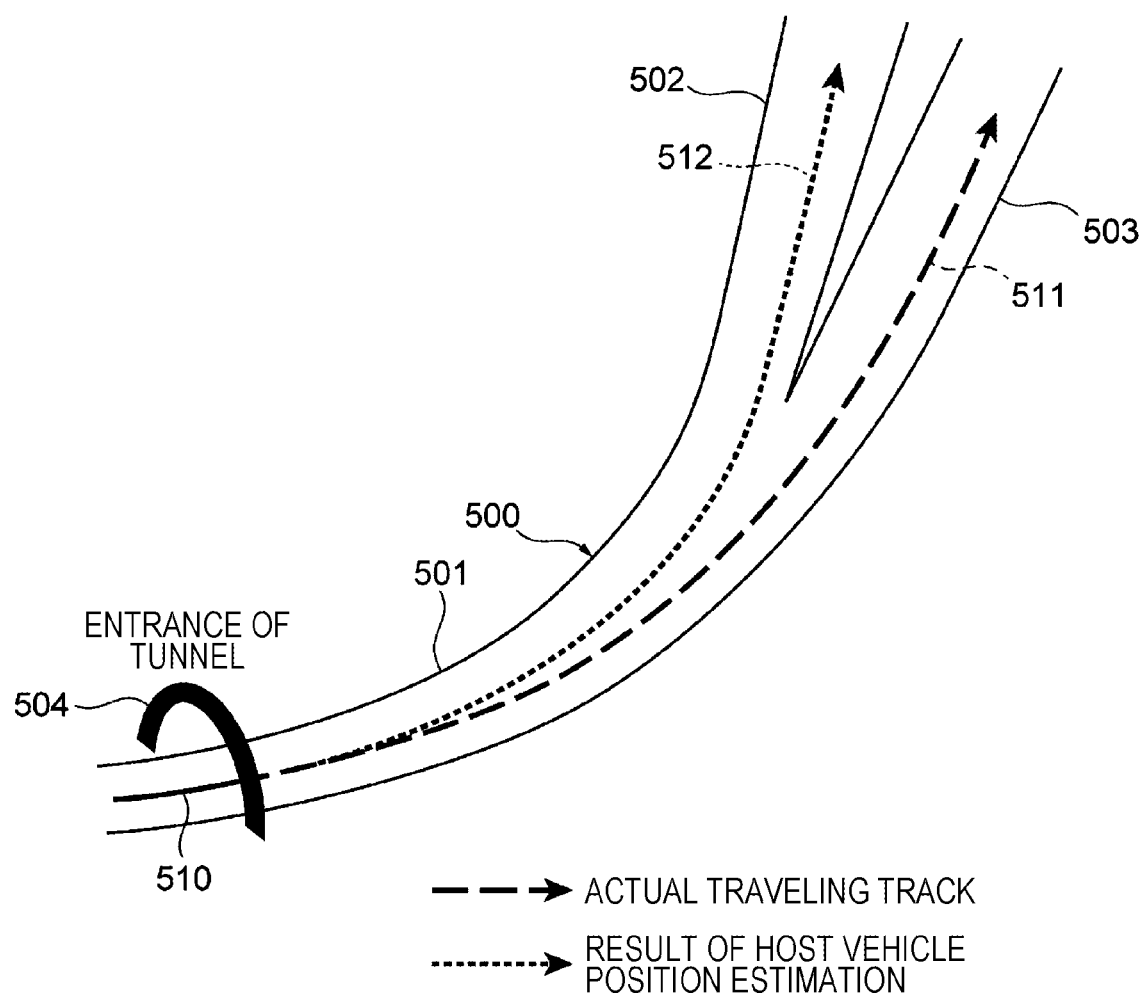
FIG. 5 is a schematic diagram in a case where the present embodiment is not implemented.

FIG. 5 is a schematic diagram illustrating a comparative example with respect to the present embodiment, and is a diagram illustrating an example of a case where a host vehicle position is estimated without performing correction based on an estimated host vehicle position on a map at the time of GNSS non-positioning.

Before a host vehicle enters a tunnel, the sensor fusion unit 10 can estimate a position 510 equivalent to an actual travel route as an estimated host vehicle position, since positioning by the GNSS 103 is possible. However, when the host vehicle enters the tunnel from an entrance 504 of the tunnel, positioning by the GNSS 103 cannot be performed, and deviation starts to occur between an actual traveling track 511 and a track 512 of an estimated host vehicle position that is a result of the sensor fusion unit 10 due to influence of an error of the inertial sensor 101 and the vehicle information 102. If this difference becomes large, there is a possibility that determination for estimating a traveling road is wrong in map matching processing of the on-map position estimation unit 11.

For example, in FIG. 5, an actual vehicle is traveling on a road 501 on the right side at a branch of a road 503 in the tunnel, but the on-map position estimation unit 11 using a result of the sensor fusion unit 10 that is not corrected determines that the vehicle is traveling on a road 502 on the left side.

Figure 6:
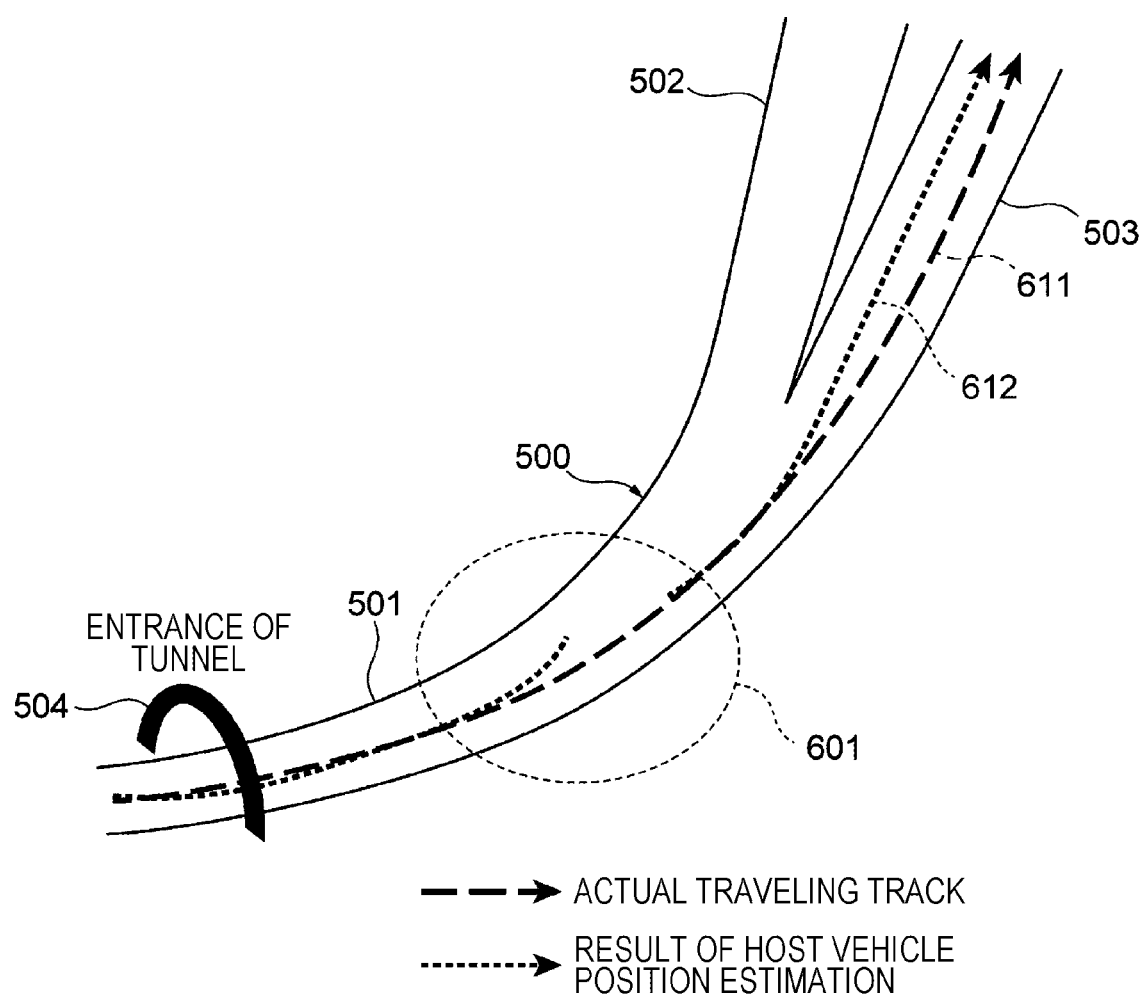
FIG. 6 is a schematic diagram in a case where the present embodiment is implemented.

FIG. 6 is a schematic diagram in a case where the present embodiment is implemented, and illustrates operation in a case where a host vehicle position of the sensor fusion unit 10 is corrected to a host vehicle position on a map by receiving an instruction of position correction from the correction determination unit 12.

When a vehicle enters the tunnel from the entrance 504 and the GNSS 103 cannot perform positioning, deviation starts to occur between an actual traveling track and a track of an estimated host vehicle position as a result of the sensor fusion unit 10 due to influence of a measurement error of the inertial sensor 101 and the vehicle information 102. After the above, in a case where the correction determination unit 12 determines that a host vehicle is traveling in parallel to a road from shape information of a lane marking or a road edge from the camera 104, more specifically, in a case where the correction determination unit 12 determines that a host vehicle is traveling on a traveling lane of a road in parallel with and along the traveling lane, a signal for performing correction is transmitted to the sensor fusion unit 10. Note that a state in which a host vehicle travels on a traveling lane of a road in parallel with and along the traveling lane includes a case in which the host vehicle travels on a line connecting lane centers of the traveling lane and a case in which the host vehicle travels in parallel with a road direction at a position separated from a line connecting lane centers within a predetermined range in a road width direction on the traveling lane.

For example, if correction is performed in a situation where a host vehicle is traveling in a direction intersecting the lane center of a traveling lane of a road, such as during a lane change, that is, in a situation where a correction condition that the host vehicle is traveling in an orientation parallel to the lane center of the traveling lane is not satisfied, an error may occur in a position and a direction of the host vehicle to be estimated. Therefore, in the present invention, the correction determination unit 12 determines whether or not a situation satisfies a correction condition, and in a case where the situation is determined to satisfy the correction condition, a signal to perform correction is transmitted to the sensor fusion unit 10.

The sensor fusion unit 10 estimates a host vehicle position on the basis of an on-map position output by the on-map position estimation unit 11, a road direction of the on-map position, and information of the inertial sensor 101 and the vehicle information 102 (dashed circle line in FIG. 6). The sensor fusion unit 10 continues estimation of a host vehicle position while repeating correction to a road position on a map for each correction determination by the correction determination unit 12. Then, the on-map position estimation unit 11 estimates a host vehicle position on a map on the basis of the host vehicle position estimated by the sensor fusion unit 10.

This correction can reduce influence of a measurement error of the inertial sensor 101 and the vehicle information 102 and a difference between information of the map 105 and an actual road shape. As a result, a track of an estimated host vehicle position output by the sensor fusion unit 10 becomes close to a track of an actual travel route, and accuracy of a host vehicle position estimated by the on-map position estimation unit 11 is improved.

As described above, by estimating a host vehicle position, the host vehicle position estimation device 100 can reduce a position error caused by influence of a measurement error of the inertial sensor 101 and the vehicle information 102 that has conventionally occurred due to correction of an estimated host vehicle position to an on-map position in a situation where positioning of the GNSS 103 cannot be performed for a long period of time such as in a tunnel, and it is possible to improve position estimation accuracy.

Here, as a method of performing the correction, for example, a method of changing an estimated host vehicle position to an on-map position estimated by the on-map position estimation unit 11 and a road direction of the on-map position (a method of moving the position by one time of correction), a method of using an estimated host vehicle position for filter processing as positioning information of an absolute position having an optional error amount similarly to positioning information of the GNSS 103 (a method of moving the position little by little), and the like can be considered. However, if the estimated host vehicle position is corrected so as to be close to on-map position information estimated by the on-map position estimation unit 11, the effect of the present invention can be obtained.

Further, in the present system, an image from the camera is used only for a relationship of relative positions between a lane marking and a host vehicle, and it is not necessary to perform advanced image processing calculation and the like, and it is possible to perform the system with small calculation time.

Further, since a vehicle equipped with a driving assistance system such as a lane keeping function already has a function of detecting a relative position between a vehicle and a lane marking, the present system can be realized with less calculation time by use of information of the relative position.

Further, according to the host vehicle position estimation device of the present embodiment, by limiting a timing of correction to an on-map position to a case of traveling in parallel to a traveling lane of a road, for example, a problem that an estimated direction of a vehicle becomes greatly wrong in a case where the correction is performed in a case of not traveling in parallel with a road such as during a lane change does not occur, and thus a direction can also be corrected.

Furthermore, even in a case where an actual traveling direction deviates due to an error in correction, influence of the error can be reduced in a case where a vehicle is traveling substantially parallel to a traveling road.

Figure 3:
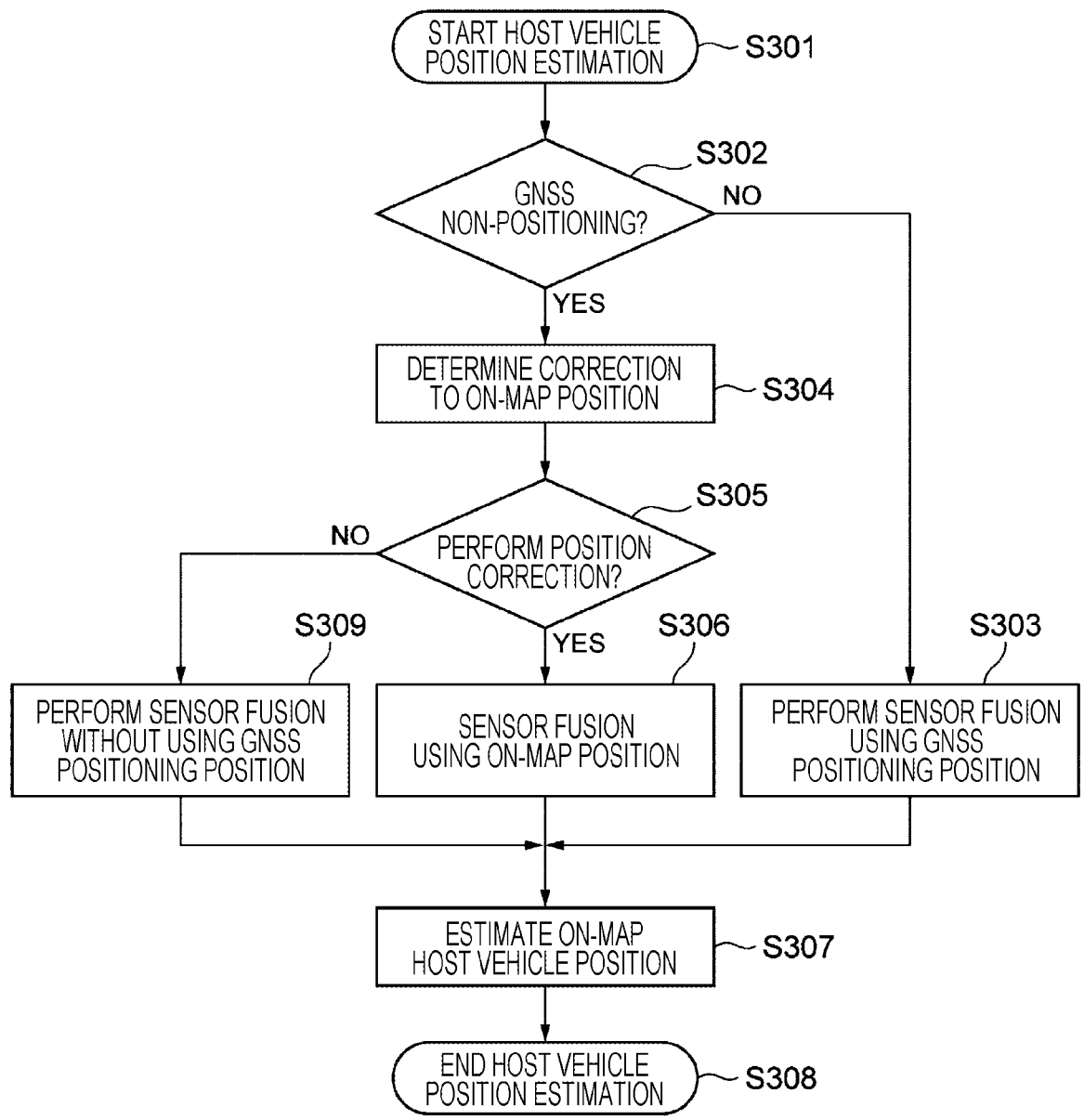
FIG. 3 is a flowchart of host vehicle position estimation.

FIG. 3 is a flowchart of calculation of the host vehicle position estimation device 100.

FIG. 3 is a flowchart explaining a host vehicle position estimation method using the host vehicle position estimation device of the present embodiment.

When host vehicle position estimation is started (S301), whether positioning information of the GNSS 103 is currently available is determined (S302). In a case where positioning information of the GNSS 103 is available (NO in S302), sensor fusion (S303) using the positioning information of the GNSS 103 is performed. After the above, an on-map host vehicle position is estimated (S307), and the host vehicle position estimation ends (S308).

On the other hand, in a case where the GNSS 103 is determined not to perform positioning, that is, positioning information of the GNSS 103 is determined not to be available in S302 (YES in S302), correction determination to an on-map position is performed (S304). After the above, in a case where position correction is determined to be performed from a result of correction determination to an on-map position (YES in S305), sensor fusion (S306) using an on-map position is performed based on a previously estimated on-map position, output of the inertial sensor 101, and information of the vehicle information 102, and then on-map host vehicle position estimation (S307) is performed. Further, in a case where position correction is determined not to be performed in S305 (NO in S305), sensor fusion (S309) is performed based on output of the inertial sensor 101 and information of the vehicle information 102, and then on-map host vehicle position estimation (S307) is performed.

Here, the sensor fusion (S303, S309) is preferably a method of estimating a current host vehicle position using absolute position and traveling direction information or relative position change information, and examples of the method include a method using filter processing such as a Kalman filter.

Further, the on-map position estimation unit 11 performs what is called map matching processing to estimate a road on which a host vehicle is currently traveling and estimate a position on the road, and output them. In the estimation of a road, there may be determined to be a plurality of roads on which a vehicle is possibly traveling depending on a position change of an estimated host vehicle position and a road shape. For example, there is a case where there is a possibility that a vehicle is traveling on a plurality of roads immediately after traveling on a branch road or on a parallel road.

Figure 4:
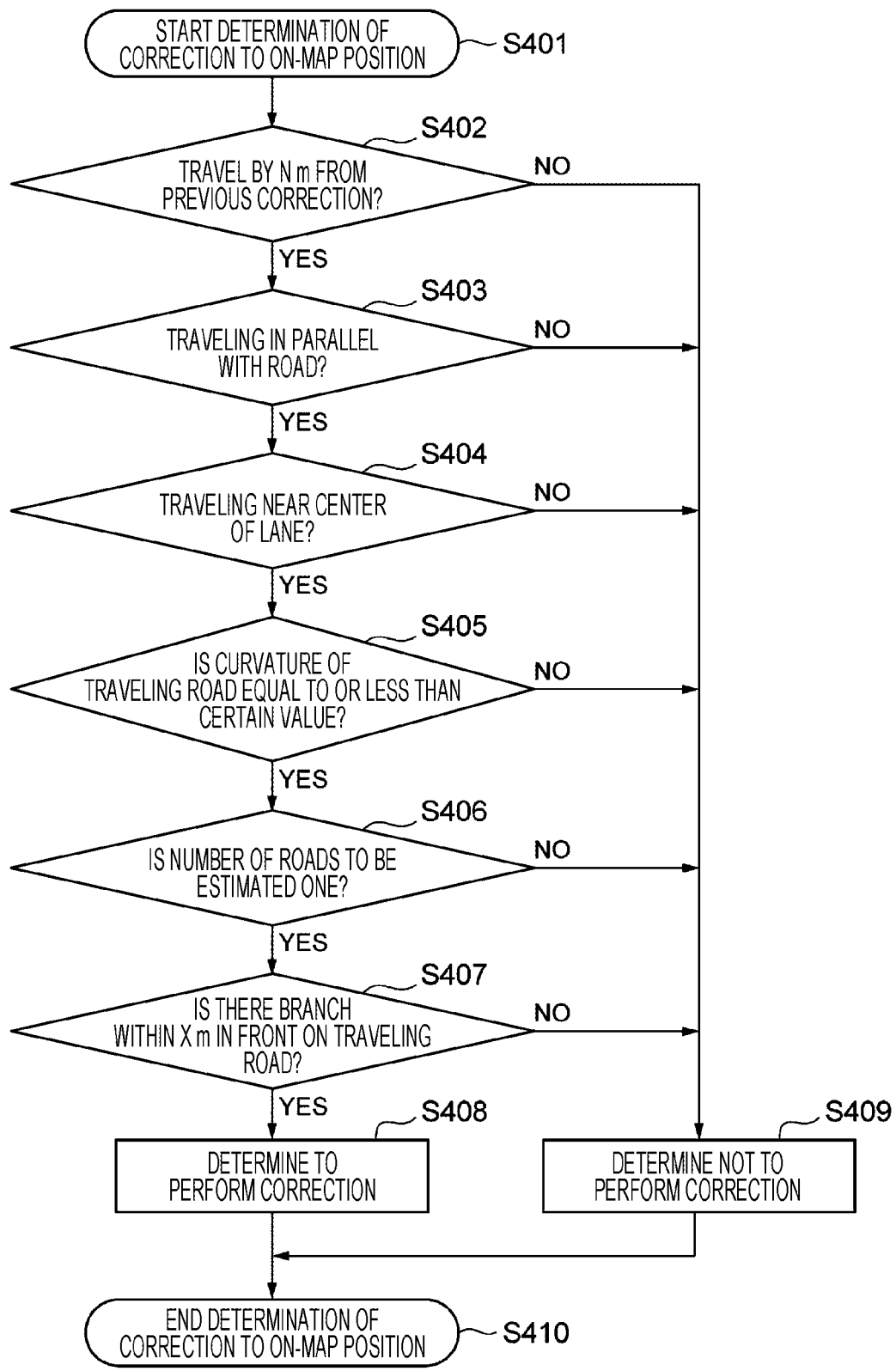
FIG. 4 is a flowchart of correction determination to an on-map position.

FIG. 4 illustrates a flowchart of correction determination to an on-map position (S304). FIG. 4 is a flowchart for determining whether or not a correction condition is satisfied. When correction determination to an on-map position is started (S401), correction determination to an on-map position is made by determining whether a vehicle travels by N meters (m), which is a certain distance from previous correction (S402). Therefore, correction can be performed at regular distance intervals from previous correction, and predetermined positional accuracy can be maintained while calculation load is reduced. In a case where a vehicle does not travel by a certain distance after previous correction (NO in S402), correction is determined not to be performed (S409).

Then, in a case where a vehicle travels by a certain distance or more after previous correction (YES in S402), next, whether a vehicle is traveling in parallel with a road (S403). In the present embodiment, determination as to whether a vehicle is traveling parallel with a road is made on the basis of lane information captured by the camera. In the determination as to whether a host vehicle is traveling in parallel with a road, the host vehicle is determined to travel in parallel with a lane in a case of a predetermined situation, for example, in a case where a relative distance between the host vehicle and a lane marking on the side does not change within a certain range from a certain travel section or more, or in a case where a function indicating a relative relationship between the host vehicle and a lane marking recognized by the camera and a shape change of the lane marking is within a certain change amount during a certain travel section. In a case where the host vehicle is not traveling in parallel with a road (NO in S403), there is a possibility that an error in a position and direction of the host vehicle becomes large due to correction, and thus, correction is determined not to be performed (S409).

In a case where a host vehicle travels in parallel with a road (YES in S403), distance information to the left and right lanes is calculated from an image of the camera, a relative distance between the host vehicle and a lane is calculated from the distance information, and whether a traveling position of the host vehicle is near the center of the traveling lane is determined from the relative distance (S404). When the traveling position of the host vehicle is not near the center of the traveling lane (NO in S404), there is a possibility that an error in a position and direction of the host vehicle becomes large due to correction, and thus correction is determined not to be performed (S409).

In a case where a host vehicle is determined to be traveling near a lane center (YES in S404), next, whether a curvature of a traveling road currently estimated by the on-map host vehicle position estimation (S307) is equal to or less than a certain value is determined (S405). In a case where the curvature of the traveling road is not equal to or less than the certain value (NO in S405), there is a possibility that an error in a position and direction of the host vehicle becomes large due to correction, and thus, correction is determined not to be performed (S409).

When the curvature of a road is equal to or less than the certain value, next, whether the number of traveling roads currently estimated by the on-map host vehicle position estimation (S307) is one is determined (S406). In a case where a plurality of traveling roads are estimated by the on-map host vehicle position estimation (S307), there is a possibility of an error on a road on which a host vehicle travels, and thus correction is determined not to be performed (S409).

In a case where the number of roads on which a vehicle is estimated to be traveling is one (YES in S406), whether a branch exists within X meters (m) which is a certain distance in front on a traveling road is determined (S407). In a case where no branch exists within a certain distance in front on the traveling road (YES in S407), correction is determined to be performed (S408). After the above, correction determination to an on-map position ends (S410). In a case where a branch exists within a certain distance in front on the traveling road (NO in S407), there is a possibility of an error on a road on which a host vehicle travels, and thus, correction is determined not to be performed (S409).

As described above, in a case where at least one of the determinations (S402) to (S407) is missed, correction is determined not to be performed (S409). After the above, correction determination to an on-map position ends (S410). However, in the flowchart of FIG. 4, a plurality of condition determinations are performed even in a case other than a case where a vehicle is traveling in parallel with a road, but it is not necessary to perform all the determinations, and a condition determination may be removed as necessary, or an additional determination may be made.

Further, in the determination in S403 that a vehicle is traveling in parallel with a road, for example, the vehicle can be determined to be traveling in parallel with a road by a method of determining from a fact that a distance to left and right lane markings and a road end does not change for a certain period, or in a case where an absolute value of the sum of the left and right of a primary coefficient representing an inclination of a lane marking and a road end in the vicinity of the vehicle is equal to or less than a predetermined value by approximating the left and right lane markings and the road end by a multi-dimensional function. Even in a case other than the above, for example, if a camera modules independently provides an index indicating whether or not a vehicle travels in parallel with a lane, the index may be used as the basis.

In the present embodiment, the correction determination unit 12 determines that a vehicle is traveling in parallel with a traveling road using the camera, but the present invention is not limited to such a configuration, and another method may be used as long as a vehicle can be determined to be traveling in parallel with a road. For example, a method of combining a steering angle sensor of a steering wheel and road map information and determining that a vehicle is traveling in parallel with a road in a case where a steering angle does not change for a certain period of time or more in a straight road, or a method of determining that a vehicle is traveling in parallel with a road when a relative positional relationship with a vehicle in front such as a radar does not change for a certain period of time or more may be used. Further, a method in which the travel route calculation device 201 outputs a signal for determining that a vehicle is traveling parallel with a road, and a vehicle is determined to be traveling in parallel with the road based on the signal may be used.

Further, determination may also be made only based on map data without using information from the camera in such a manner that a vehicle is determined to be traveling along a road in a case where a section can be determined to be one in which a vehicle travels along a road in many cases, such as a case in which the number of lanes of the road on which the vehicle is traveling is one based on map information.

Here, the effect of the present invention is not limited to the configuration of the present embodiment, and a plurality of functional portions may be implemented by the same element, or may be implemented by combining a plurality of elements or arithmetic functions in order to implement a single function.

Further, in the present embodiment, the host vehicle position estimation device is incorporated in an automatic driving vehicle, but the host vehicle position estimation device can be used as long as the host vehicle position estimation device is for host vehicle position estimation of a device that travels on a road on a map such as an automobile. For example, the present invention may be used in a navigation system, a driving assistance system, an emergency call device, or the like.

Second Embodiment

In the present embodiment, a correction method in which more information from the camera is employed than the configuration of the first embodiment will be described. In the present embodiment, a difference from the first embodiment will be described, and description of an overlapping part will be omitted.

Figure 7:
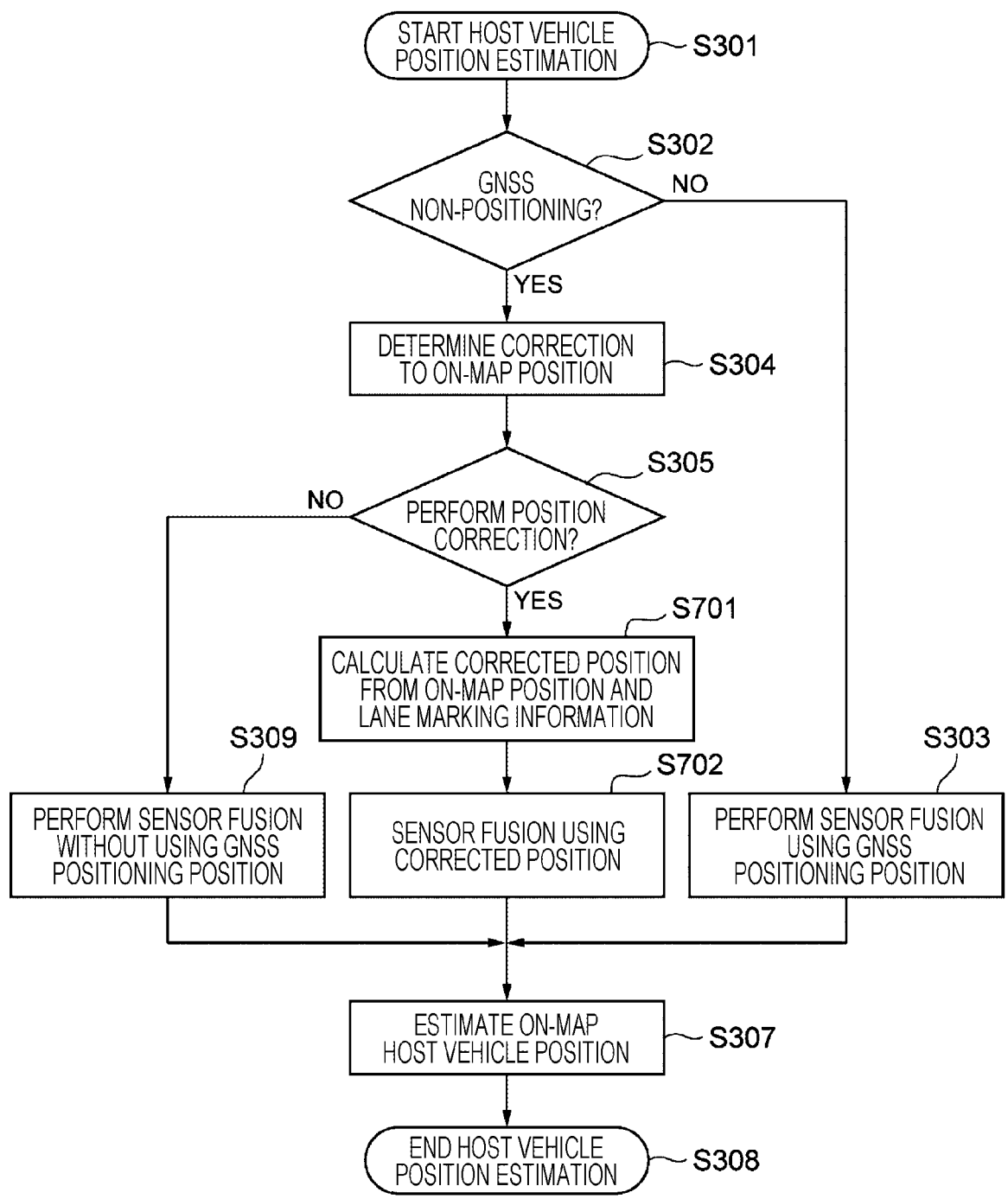
FIG. 7 is a flowchart of host vehicle position estimation according to a second embodiment.

FIG. 7 illustrates a flowchart of calculation of the host vehicle position estimation device 100 according to the present embodiment.

When host vehicle position estimation is started (S301), whether positioning information of the GNSS 103 is currently available is determined (S302). In a case where positioning information of the GNSS 103 is available, sensor fusion (S303) using a GNSS positioning position is performed. After the above, an on-map host vehicle position is estimated (S307), and the host vehicle position estimation ends (S308).

On the other hand, in a case where the GNSS 103 is determined not to perform positioning, or positioning information is determined not to be available in S302 (YES in S302), correction determination to an on-map position is performed (S304). After the above, in a case where correction is determined to be performed from a result of the correction determination to the on-map position (YES in S305), a host vehicle position and a traveling direction to be corrected are calculated from the previously estimated on-map position and information of a lane marking (S701).

After the above, sensor fusion (S702) using the on-map position is performed on the basis of the calculated corrected position and direction, detection information by the inertial sensor 101, and information of the vehicle information 102, and then the on-map host vehicle position estimation (S307) is performed. When the correction is determined not to be performed in S305 (NO in S305), sensor fusion (S309) is performed based on detection information by the inertial sensor 101 and information of the vehicle information 102 without using information of positioning position of the GNSS 103, and then the on-map host vehicle position estimation (S307) is performed.

Here, details of processing of calculating a host vehicle position and a traveling direction to be corrected based on the previously estimated on-map position and the information of a lane marking (S701) will be described with reference to FIG. 8.

Figure 8:
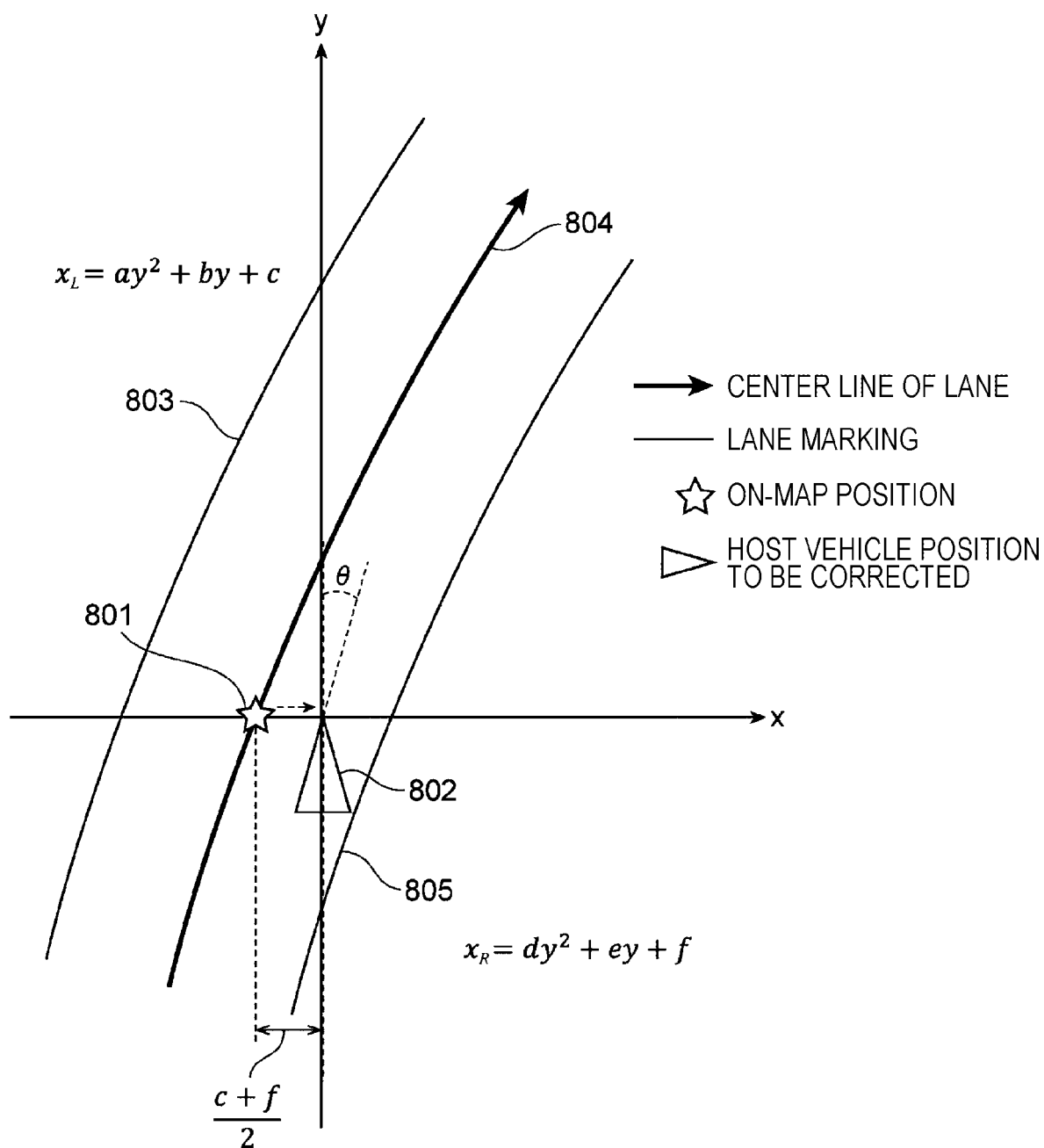
FIG. 8 is an image diagram of host vehicle position correction by a camera.

FIG. 8 is an image diagram in which the previously estimated on-map position and the information on a lane marking are displayed in a superimposed manner. In FIG. 8, reference numeral 804 denotes a center line of a lane on which a host vehicle is traveling, reference numeral 801 denotes a position on a map on which the host vehicle is currently traveling estimated by the on-map position estimation unit 11, and reference numerals 803 and 805 denote lane markings on the left and right of the host vehicle.

Further, reference numeral 802 denotes a host vehicle position after correction by the processing illustrated in (S701) of FIG. 7. The reference numerals 803 and 805 denote lane markings recognized by the camera, approximate to a quadratic function with a host vehicle position as an origin and a host vehicle traveling direction as a Y axis, and are detected as $x_L = ay^2 + by + c$ and $x_R = dy^2 + ey + f$.

In this case, the host vehicle position 802 after correction is deviated in parallel by $(c+f)/2$ in a lateral direction (X-axis direction) from the center line 804 of a road at the currently traveling host vehicle position 801, and a traveling direction (Y-axis direction) of the vehicle is calculated in a manner that the vehicle is traveling in a direction rotated by $\theta = \mathrm{atan}((b+e)/2)$ with respect to a traveling direction of a lane.

As described above, by calculating detailed host vehicle position and direction based on lane marking information from the camera, a host vehicle position can be corrected even in a case where a host vehicle is not traveling in parallel with a road. Therefore, as compared with the correction method of the first embodiment, correction of a host vehicle position can be performed with high frequency, and a correct traveling road can be estimated even in a case where an error of the inertial sensor 101 and the vehicle information 102 is large.

Further, by moving a reference position of an absolute position of a host vehicle with reference to the position 801 on a map on which the host vehicle is currently traveling, it is not necessary to estimate an absolute position in the map from a characteristic landmark or the like, so that an amount of calculation can be reduced. Further, it is not necessary to incorporate map data holding a landmark in the host vehicle position estimation device, and an amount of data to be held in the device can be reduced, so that cost of the device can be reduced.

Further, a position for which correction is performed can be made more accurate by correcting a position and a direction, and for example, a position can be corrected even during traveling that is not parallel to a traveling lane for a long period of time, such as during gentle changing of a lane, and a traveling road can be estimated with high reliability.

Further, detection of a lane marking this time is approximated by a quadratic function, but the order, the origin position, and the like of an approximate curve are not limited to those in the present embodiment as long as relative positions of a vehicle traveling direction and a lane marking or a traveling lane are known.

Further, in the present embodiment, a relative position and a direction with respect to a traveling lane are obtained by a recognition function of a lane marking of the camera. However, for example, measurement using another sensor such as lidar or radar may be used and a detection object may be an object inferred to be parallel to a traveling lane such as a road edge, a road outer wall surface, or the like instead of a lane marking, as long as a host vehicle position can be corrected using a relative position and a direction of a vehicle and a lane detected by these sensors.

Although the embodiment of the present invention is described in detail above, the present invention is not restricted to the above embodiment, and various design changes can be made without departing from the spirit of the present invention described in the claims. For example, the above embodiment is described in detail for easy understanding of the present invention, and the present invention is not necessarily limited to an embodiment that includes all the described configurations. Further, part of a configuration of a certain embodiment can be replaced with a configuration of another embodiment, and a configuration of a certain embodiment can be added to a configuration of another embodiment. Furthermore, for part of a configuration of each embodiment, other configurations may be added, removed, or replaced with.

REFERENCE SIGNS LIST 10 sensor fusion unit
11 on-map position estimation unit
12 correction determination unit
100 host vehicle position estimation device
101 inertial sensor
102 vehicle information
103 GNSS
104 camera
105 map
200 automatic driving vehicle
201 travel route calculation device
202 vehicle control device

The invention claimed is:
1. A vehicle comprising:
a map;
one or more sensors configured to generate information associated with a vehicle position of the vehicle on the map; and
one or more processors coupled to the one or more sensors, the one or more processors configured to:
  combine the information from the one or more sensors to determine first sensor information indicative of a change in behavior of the vehicle,
  receive second sensor information from the one or more sensors indicative of an absolute position of the vehicle, wherein the information comprises the second sensor information,
  combine the information from the one or more sensors to determine third sensor information indicative of a traveling state of the vehicle with respect to a traveling lane, the vehicle traveling on the traveling lane,
  determine map information from the map, the map information indicative of a road on which the vehicle is travelling,
  after determining that the second sensor information is available, estimate the vehicle position on the map using the first sensor information, the second sensor information, and the map information, and
  after determining that the second sensor information is unavailable, determine whether a correction condition of the vehicle is satisfied,
  after determining that the correction condition is satisfied:
    calculate a quadratic function indicating a change in a shape of lane markings of the traveling lane using the third sensor information,
    calculate an amount of lateral parallel deviation of the vehicle from a center line of the traveling lane using the third sensor information,
    calculate a difference between a traveling direction of the traveling lane and a traveling direction of the vehicle using the third sensor information,
    correct the vehicle position and traveling direction on the map based on the quadratic function, the amount of lateral parallel deviation, and the difference, and
    estimate the vehicle position on the map using the corrected vehicle position, the first sensor information, and the third sensor information,
  after determining that the correction condition is not satisfied, estimate the vehicle position on the map using at least the first sensor information and the third sensor information,
  generate a travel route using at least the estimated vehicle position on the map, and
  control the vehicle to travel along the generated travel route.

2. A vehicle position estimation method comprising:
combining, by one or more processors, information from one or more sensors to determine first sensor information indicative of a change in behavior of the vehicle;
receiving, by the one or more processors, second sensor information from the one or more sensors indicative of an absolute position of a vehicle;
combining, by one or more processors, information from the one or more sensors to determine third sensor information indicative of a traveling state of the vehicle with respect to a traveling lane, the vehicle traveling on the traveling lane;
determining, by the one or more processors, map information from a map stored by the vehicle, the map information indicative of a road on which the vehicle is traveling;
after determining that the second sensor information is available, estimating, by the one or more processors, a vehicle position on the map using the first sensor information, the second sensor information, and the map information;
after determining that the second sensor information is unavailable, determining, by the one or more processors, whether a correction condition of the vehicle is satisfied;
after determining that the correction condition is satisfied:
  calculating, by the one or more processors a quadratic function indicating a change in a shape of lane markings of the traveling lane using the third sensor information,
  calculating, by the one or more processors, an amount of lateral parallel deviation of the vehicle from a center line of the traveling lane using the third sensor information, calculating, by the one or more processors, a difference between a traveling direction of the traveling lane and a traveling direction of the vehicle using the third sensor information, correcting, by the one or more processors, the vehicle position and traveling direction on the map based on the quadratic function, the amount of lateral parallel deviation, and the difference, and estimating, by the one or more processors, the vehicle position on the map using the corrected vehicle position, the first sensor information, and the third sensor information, after determining that the correction condition is not satisfied, estimating, by the one or more processors, the vehicle position on the map using at least the first sensor information and the third sensor information;

generating, by the one or more processors, a travel route using at least the estimated vehicle position on the map; and controlling, by the one or more processors, the vehicle to travel along the generated travel route.

* * * * *